United States Patent
Giraud et al.

(10) Patent No.: US 10,864,780 B2
(45) Date of Patent: Dec. 15, 2020

(54) BEAD WIRE FOR A TIRE, TIRE AND MANUFACTURING METHOD

(71) Applicant: COMPAGNIE GENERALE DES ETABLISSEMENTS MICHELIN, Clermont-Ferrand (FR)

(72) Inventors: Michel Giraud, Clermont-Ferrand (FR); Anne-Lise Muller, Clermont-Ferrand (FR); Jérôme Gravier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 218 days.

(21) Appl. No.: 16/031,674

(22) Filed: Jul. 10, 2018

(65) Prior Publication Data

US 2019/0030961 A1    Jan. 31, 2019

Related U.S. Application Data

(62) Division of application No. 14/901,366, filed as application No. PCT/EP2014/063569 on Jun. 26, 2014, now Pat. No. 10,207,549.

(30) Foreign Application Priority Data

Jun. 28, 2013   (FR) ...................................... 13 56248

(51) Int. Cl.
*B60C 15/04*   (2006.01)
*B29D 30/48*   (2006.01)
(Continued)

(52) U.S. Cl.
CPC .............. *B60C 15/04* (2013.01); *B29D 30/08* (2013.01); *B60C 9/02* (2013.01); *D02G 3/48* (2013.01);
(Continued)

(58) Field of Classification Search
CPC .... B60C 15/04; B60C 2014/048; B29D 30/48
See application file for complete search history.

(56) References Cited

U.S. PATENT DOCUMENTS

| 5,205,883 A | 4/1993 | Kanamaru |
| 2006/0207710 A1 | 9/2006 | Yoshikawa et al. |

FOREIGN PATENT DOCUMENTS

| EP | 154597 | * 9/1985 |
| EP | 1 350 639 | 10/2003 |

(Continued)

*Primary Examiner* — Justin R Fischer
(74) *Attorney, Agent, or Firm* — Cozen O'Connor

(57) ABSTRACT

The bead wire (52) comprises several windings of wire and a basic hexagonal bead wire (56) comprising: two axially and radially external lateral rows (F1, F2) of N2 windings, two axially external and radially internal lateral rows (F3, F4) of N2 windings, where N1=N2+1 or N1=N2, two junctions (J1, J2), each formed by a winding that an axially and radially external lateral row (F1, F2) and an axially external and radially internal lateral row (F3, F4), have in common, each winding in common having no winding of wire axially on the outside of it. The bead wire (52) comprises two axially and radially external additional lateral rows (A1, A2) of N3 windings substantially parallel respectively to each axially and radially external lateral row (F1, F2).

10 Claims, 5 Drawing Sheets

(51) Int. Cl.
*B29D 30/08* (2006.01)
*B60C 9/02* (2006.01)
*D02G 3/48* (2006.01)
*D07B 1/06* (2006.01)

(52) U.S. Cl.
CPC ...... *D07B 1/0633* (2013.01); *B60C 2015/046* (2013.01); *B60C 2015/048* (2013.01)

(56) References Cited

FOREIGN PATENT DOCUMENTS

| | | |
|---|---|---|
| JP | 3027679 | 4/2000 |
| JP | 2006-175915 | 7/2006 |

\* cited by examiner

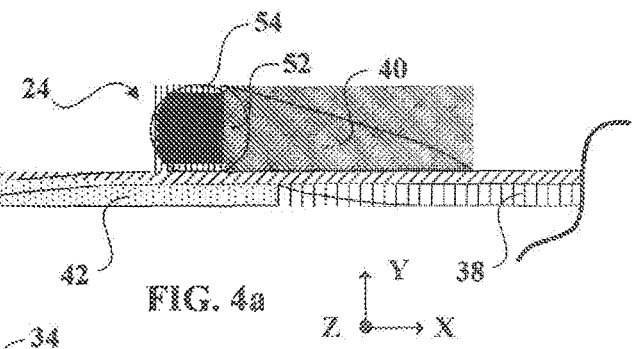
FIG. 4a
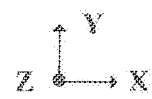
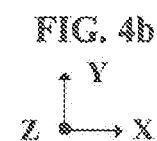
FIG. 4b
FIG. 4c
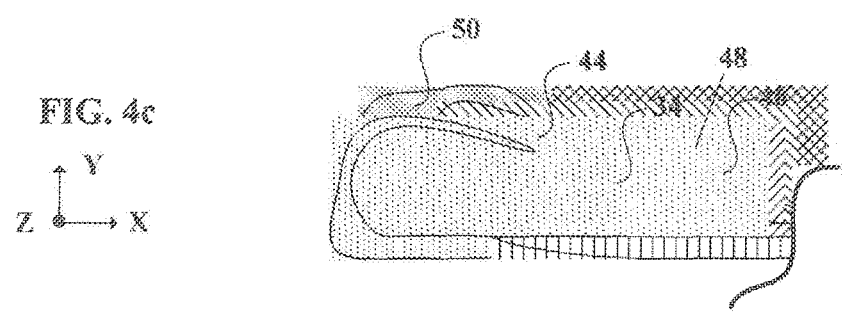
FIG. 4d

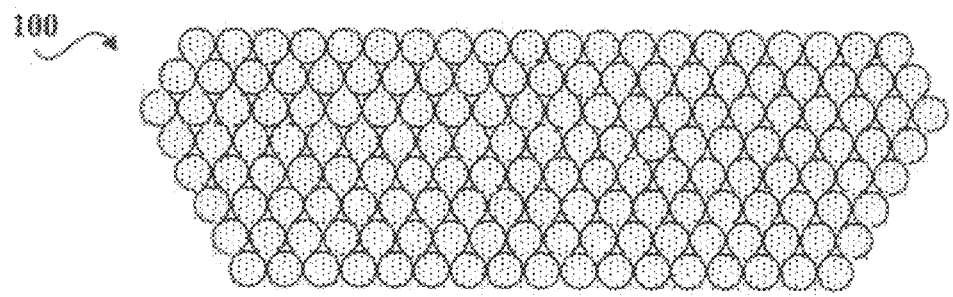
FIG. 9 - Prior Art
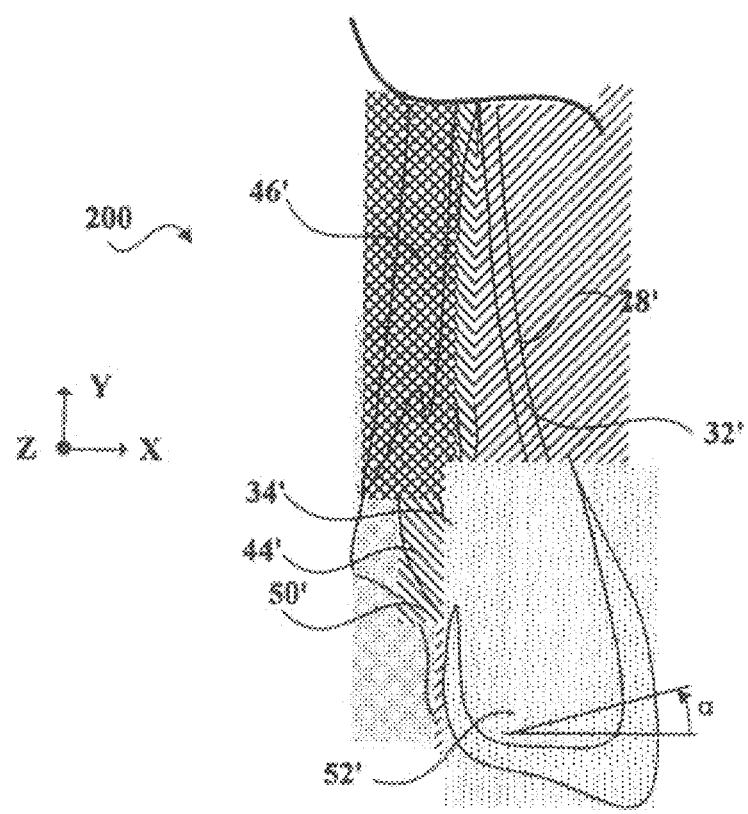
FIG. 10 - Prior Art

BEAD WIRE FOR A TIRE, TIRE AND MANUFACTURING METHOD

RELATED APPLICATIONS

This application is a divisional of U.S. patent application Ser. No. 14/901,366 filed Dec. 28, 2015, which is a U.S. National Stage of International Application No. PCT/EP2014/063569 filed Jun. 26, 2014, which claimed priority of French application no. 1356248 filed Jun. 28, 2013, the entire content of all of which are hereby incorporated by reference.

FIELD OF THE INVENTION

The invention relates to a bead wire for a tire, to a tire and to the method of manufacturing same. The invention applies to any type of tire, notably to tires of industrial vehicles selected from motor vehicles of the passenger car type, SUVs (Sport Utility Vehicles), two wheeled vehicles (notably bicycles, motorbikes), heavy vehicles such as heavy goods vehicles—i.e., metro vehicles, buses, road haulage vehicles (lorries, tractors, trailers), off the road vehicles—agricultural vehicles or construction plant vehicles, aircraft, other transport or handling vehicles.

BACKGROUND OF THE INVENTION

A tire comprising a crown comprising a crown reinforcement surmounted by a tread is known from the prior art. Two sidewalls extend the crown radially inwards. The tire comprises two beads radially on the inside of the sidewalls and each comprising an annular reinforcing structure. The annular reinforcing structure comprises a bead wire substantially of revolution about an axis comprising several windings of at least one wire which are arranged axially next to one another over several layers radially superposed on one another. The wire has a substantially circular cross section. Such a bead wire is generally referred to as a round bead bundle. The bead wire of the prior art, illustrated in FIG. 9, may be bare or encased in a mass of encasing rubber.

The tire also comprises a radial carcass reinforcement extending from the beads to the sidewalls towards the crown. The carcass reinforcement comprises one or more carcass plies, at least one of these carcass plies being anchored in each of the beads by being folded around the annular reinforcing structure, in contact with the bead wire or the encasement thereof, so as to form, within each bead, a main strand extending radially between each bead through the sidewalls and the crown and a turnup extending radially from each bead through each sidewall.

Each bead comprises a mass of filling rubber arranged in contact with the bead wire or the encasement thereof, in a space delimited by the main strand and turnup. Each bead also comprises additional masses of rubber arranged axially on the outside of the turnup.

During the manufacture of the tire of the prior art, which is performed for example on a tire-building drum, the bead wire is placed on the carcass ply and the turnup is folded around the bead wire. The carcass ply and the bead wire are then turned relative to one another. During this rotation, the mass of filling rubber and the folding of the carcass ply comprising the main strand and the turnup rub against the bead wire or the encasement thereof, thereby creating what is referred to as a braking torque that prevents the relative rotation of the bead wire with respect to the rest of the tire, notably with respect to the carcass ply.

The braking torque causes the turnup of the carcass ply and the additional masses of rubber arranged axially on the outside of the turnup to be placed in compression. The braking torque also causes the main strand of the carcass ply to be placed in overtension. Under the effect of the overtension in the main strand, the windings of the bead wire, notably the windings in contact with the overtensioned main strand become disorganized. In addition, the friction leads to limited relative rotation which prevents the bead wire from adopting a correct orientation within the tire.

When they occur, these potential problems, which have been deliberately exaggerated in FIG. 10, cause the tire to have to be scrapped.

SUMMARY OF THE INVENTION

It is an object of the invention to provide a bead wire that makes it possible to reduce the number of tires that have to be scrapped as a result of a problem generated by the braking torque.

To this end, one aspect of the invention is directed to a bead wire for a tire substantially of revolution about an axis comprising several windings of at least one wire which are arranged axially next to one another over N layers $C_i$ radially superposed on one another, the bead wire for a tire comprising a basic hexagonal bead wire comprising:
- a radially external layer of N1 windings,
- a radially internal layer of N1 windings,
- two axially and radially external lateral rows of N2 windings axially opposite one another,
- two axially external and radially internal lateral rows of N2 windings axially opposite one another, with N1=N2+1 or N1=N2,
- two junctions, each one formed by a winding that an axially and radially external lateral row and an axially external and radially internal lateral row have in common, each winding in common forming each junction having no winding of the wire axially on the outside of it, the bead wire for a tire also comprising at least two axially and radially external additional lateral rows, each axially and radially external additional lateral row being respectively substantially parallel to each axially and radially external lateral row.

A row means a juxtaposition in a substantially rectilinear main direction of several windings arranged so that each is in contact with the next.

A lateral row means a row the main direction of which is inclined with respect to the axial direction of the tire.

A layer means a row extending in a main direction substantially parallel to the axial direction of the tire.

Two rows are substantially parallel if the main directions in which they extend are substantially parallel to one another.

A layer of the hexagonal base bead wire is said to be "radially external" if the main direction in which it extends is further away from the axis of rotation of the tire than those of the other layers of the hexagonal base bead wire. Conversely, a layer of hexagonal base bead wire is said to be "radially internal" if the main direction in which it extends is closer to the axis of rotation of the tire than those of the other layers of the hexagonal base bead wire.

A lateral row of the hexagonal base bead wire is said to be "axially and radially external" if the main direction in which it extends is axially and radially further away from the centre of the hexagonal base bead wire than those of the other lateral rows of the hexagonal base bead wire when progressing axially from the inside towards the outside of the hexagonal base bead wire and radially from the inside towards the outside of the tire. Conversely, a lateral row of the hexagonal base bead wire is said to be "axially external and radially internal" if the main direction in which it extends is axially and radially further away from the centre of the hexagonal base bead wire than those of the other lateral rows of the hexagonal base bead wire when progressing axially from the inside towards the outside of the hexagonal base bead wire and radially from the outside towards the inside of the tire.

The same definitions will be applied to the additional coverings, rows and layers of the bead wire for a tire.

The bead wire according to an embodiment of the invention makes it possible to reduce or even eliminate the number of tires scrapped as a result of a problem generated by the braking torque. Specifically, the bead wire according to an embodiment of the invention has a dimension in the axial direction that is relatively close to the dimension in the radial direction. Thus, the cross section of the bead wire according to an embodiment of the invention is relatively close to a cross section of circular overall shape, which encourages the relative rotation and therefore limits the braking torque, unlike the bead wire of the prior art.

The particular shape of the bead wire according to an embodiment of the invention encouraging relative rotation is due, on the one hand, to the hexagonal shape of the base bead wire and, on the other hand, to the axially and radially external additional lateral rows which in combination allow the cross section of the bead wire according to an embodiment of the invention to better approximate to a cross section of circular overall shape.

Implicitly, each axially and radially external additional lateral row is arranged axially on the outside respectively with respect to each axially and radially external lateral row.

A first row is said to be arranged axially on the outside of a second row if the main direction in which it extends is further away from the centre of the bead wire than that of the second row when progressing in a direction substantially parallel to the axial direction of the tire. Conversely, a first row is said to be arranged axially on the inside of a second row if the main direction in which it extends is closer to the centre of the bead wire than that of the second row when progressing in a direction substantially parallel to the axial direction of the tire.

For preference, the bead wire comprises two, and only two, axially and radially external additional lateral rows, each axially and radially external additional lateral row being substantially parallel respectively to each axially and radially external lateral row.

In one embodiment, each radially external winding of each axially and radially external additional lateral row is radially substantially aligned with the radially external layer.

In another embodiment, the bead wire comprises at least one axially and radially external additional covering of windings in the overall shape of a U.

Advantageously, the covering thus allows the cross section of the bead wire to approximate still further to a cross section of circular overall shape.

Implicitly, the windings of the axially and radially external additional covering are arranged axially on the outside of each axially and radially external lateral row and radially on the outside of the radially external layer.

The windings of a covering are said to be arranged axially on the outside of a row if the main direction in which the windings of the covering extend parallel to that of the row is further away from the centre of the bead wire than that of the row that they are covering when progressing in a direction substantially parallel to the axial direction of the tire.

The windings of a covering are said to be arranged radially on the outside of a layer if the main direction in which the windings of the covering extend parallel to that of the layer is further away from the axis of the tire than that of the layer they are covering when progressing in a direction substantially parallel to the radial direction of the tire.

Advantageously, the axially and radially external additional covering comprises:

a radially external additional layer of N4 windings, substantially parallel to the radially external layer, at least the two axially and radially external additional lateral rows.

Implicitly, the radially external additional layer is arranged radially on the outside of the radially external layer.

A first layer is said to be arranged radially on the outside of a second layer if the main direction in which it extends is further away from the axis of the tire than that of the second layer in a direction substantially parallel to the radial direction of the tire.

For preference, the axially and radially external additional covering comprises a single radially external additional layer of N4 windings, substantially parallel to the radially external layer.

Advantageously, in order for the cross section of the bead wire to approximate still further to a cross section of circular overall shape, $\max(L_i)-N1 \leq 6$, i varying from 1 to N. Preferably, $\max(L_i)-N1 \leq 2$ i varying from 1 to N for $\max(L_i) \leq 9$ and $\max(L_i)-N1 \leq 6$, i varying from 1 to N for $\max(L_i) > 9$.

For preference, N4=N1+1. Thus, the additional covering espouses the overall shape of the hexagonal base bead wire, encouraging relative rotation of the carcass ply on the radially external additional layer.

Advantageously, with each axially and radially external additional lateral row comprising N3 windings, $N3 \leq N2$, preferably N3=N2, N3+1=N2 or N3+2=N2.

$N3 \leq N2$, preferably N3=N2, N3+1=N2 or N3+2=N2. Similarly, the additional covering espouses the overall shape of the hexagonal base bead wire thereby encouraging relative rotation of the carcass ply on the axially and radially external additional lateral rows.

Preferably, $\max(L_i)=N-1$, $\max(L_i)=N$ or $\max(L_i)=N+1$ where $L_i$ is the number of windings of each layer $C_i$, i varying from 1 to N inclusive. Thus, the bead wire has a dimension in the axial direction that is as close as possible to the dimension in the radial direction.

Advantageously, the bead wire for a tire comprises at least one layer $C_k$ where $k \in ]1, N[$ such that $L_{k+1} > L_k$ and $L_k < L_{k-1}$. Thus, the bead wire is more robust when handled. Specifically, by virtue of this feature, pressure is brought to bear on several axially external windings, in this instance those of the layers $C_{k+1}$ and $C_{k-1}$, unlike in the bead wire of the prior art on which pressure is brought to bear on just one axially external winding. Thus the load applied to each of these axially external windings and the risk of disorganizing the bead wire are limited.

For preference, for each layer $C_k$ where $k \in ]1, N[$ such that $L_{k+1} > L_k$ and $L_k < L_{k-1}$, $L_{k+1} = L_k + 1$ and $L_k + 1 = L_{k-1}$.

Optionally, the bead wire for a tire comprises at least two axially external and radially internal additional lateral rows, each axially external and radially internal additional lateral row being substantially parallel respectively to each axially external and radially internal lateral row.

The bead wire thus exhibits little tire-rim slip under the effect of the motive force, thereby improving the efficiency of the vehicle on which a tire comprising it is mounted. Specifically, each axially external and radially internal additional lateral row improves the anchorage of the bead in the rim and reduces potential slippage between rim and tire. Furthermore, the low tire-rim slip makes it possible to avoid rubbing of the tire against the rim and therefore degradation of the bead which could impair the durability of the tire.

Moreover, the axially external and radially internal additional lateral rows allow, in combination with the hexagonal shape of the base bead wire, the cross section of the bead wire to better approximate to a cross section of circular overall shape, thereby encouraging relative rotation.

Implicitly, each axially external and radially internal additional lateral row is arranged axially on the outside respectively of each axially external and radially internal lateral row.

Advantageously, the bead wire for a tire comprises two pairs of axially external and radially internal additional lateral rows respectively of N5 and N6 windings, each axially external and radially internal additional lateral row being substantially parallel respectively to each axially external and radially internal lateral row. Thanks to the two pairs of axially external and radially internal additional lateral rows, the tire-rim slip of the tire is reduced still further.

Optionally, N5≥N6, preferably N5>N6, and more preferably, N5=N6+2.

In one embodiment, each radially internal winding of each axially external and radially internal additional lateral row is radially substantially aligned with the radially internal layer.

In another embodiment, the bead wire for a tire comprises at least one axially external and radially internal additional covering of windings in the overall shape of a U.

Advantageously, the bead wire comprises such an additional covering when N1<7 and preferably when N1<6. This is because reducing N1 leads to an increase in the risk of tire-rim slip and in the pressure of the rim on each winding of the bead wire. It is therefore preferable to add a covering in order to reduce this risk and better spread the pressure applied by the rim to the bead wire.

Implicitly, the windings of the axially external and radially internal additional covering are arranged axially on the outside of each axially external and radially internal lateral row and radially on the inside of the radially internal layer.

The windings of a covering are said to be arranged radially on the inside of a layer if the main direction in which the windings of the covering extend parallel to that of the layer is closer to the axis of the tire than that of the layer that they are covering when progressing in a direction substantially parallel to the radial direction of the tire.

For preference, the axially external and radially internal additional covering comprises:
a radially internal additional layer of N7 windings, and substantially parallel to the radially internal layer,
at least two axially external and radially internal additional lateral rows.

Implicitly, the radially internal additional layer is arranged radially on the inside of the radially internal layer.

A first layer is said to be arranged radially on the inside of a second layer if the main direction in which it extends is closer to the axis of the tire than that of the second layer in a direction substantially parallel to the radial direction of the tire.

For preference, the axially external and radially internal additional covering comprises a single radially internal additional layer of N7 windings substantially parallel to the radially internal layer.

For preference, N7=N1+1.

Advantageously, with each axially external and radially internal additional lateral row comprising N5 windings, N5≤N2, preferably N5=N2, N5+1=N2 or N5+2=N2.

According to other optional features of the bead wire for a tire which features are independent of one another:
The hexagonal base bead wire has an axial plane of symmetry.
The hexagonal base bead wire has a radial plane of symmetry.
The bead wire for a tire has an axial plane of symmetry.
The bead wire for a tire is obtained by successive superpositions of the N layers $C_i$, each layer $C_i$ being obtained by successive axial windings of at least one wire.
The bead wire for a tire comprises a single wire forming the windings of the N layers $C_i$.
The or each wire is made of metal.
The or each wire is made of a carbon steel containing between 0.6 and 0.9 wt % of carbon.
The or each wire has a substantially circular cross section.
The or each wire has a diameter of between 1 and 3.2 mm, preferably between 1.2 and 2.2 mm and more preferably between 1.2 and 2 mm.
N≥5, preferably N≥7 and more preferably N≥9.
max($L_i$)≥4, preferably max($L_i$)≥6 and more preferably, max($L_i$)≥9.
The total number of windings of the bead wire is greater than or equal to 30, preferably greater than or equal to 50 and more preferably greater than or equal to 70.
$|L_{k+1}-L_k|=1$ for i varying from 1 to N inclusive.

Another subject of the invention is a tire comprising:
at least one bead comprising at least one bead wire for a tire as defined hereinabove,
a carcass reinforcement comprising at least one carcass ply anchored in each bead by a turnup around the bead wire.

Another subject of the invention is a method of manufacturing a tire as defined hereinabove, in which method:
the bead wire is placed on the carcass ply,
part of the carcass ply is folded around the bead wire, and
the carcass ply and the bead wire are turned relative to one another.

In one embodiment, the bead wire is fixed and the carcass ply is turned.

In another embodiment, the carcass ply is fixed and the bead wire is turned.

In yet another embodiment, the bead wire and the carcass ply are turned.

BRIEF DESCRIPTION OF THE DRAWINGS

The invention will be better understood from reading the following description, given solely by way of nonlimiting example and made with reference to the drawings in which:

FIGS. 4a, 4b, 4c and 4d are views in cross section illustrating various steps in the method of manufacture according to the invention;

FIG. 9 is a view similar to that of FIG. 3 of a bead wire of the prior art;

FIG. 10 is a view similar to that of FIG. 2 of a bead of a tire of the prior art comprising the bead wire of FIG. 9.

DETAILED DESCRIPTION OF THE DRAWINGS

The tire according to embodiments of the invention has a toroidal overall shape about an axis of rotation. This axis of rotation defines the axial direction.

When using the term "radial" it is appropriate to make a distinction between the various different uses made of this word by those skilled in the art when referring to tires.

Firstly, the expression refers to a radius of the tire. It is in this sense that an element A is said to be "radially inside" an element B (or "radially on the inside of" the element B) if it is closer to the axis of rotation of the tire than is the element B. Conversely, an element C is said to be "radially outside" an element D (or "radially on the outside of" the element D) if it is further away from the axis of rotation of the tire than is the element D. Progress is said to be "radially inwards (or outwards)" when it is in the direction towards smaller (or larger) radii.

Secondly, a reinforcing element or a reinforcement is said to be "radial" when the reinforcing element or the reinforcing elements of the reinforcement make an angle greater than or equal to 65° and less than or equal to 90° with the circumferential direction.

Thirdly, a "radial section" or "radial cross section" here means a section or cross section on a plane containing the axis of rotation of the tire.

An "axial" direction is a direction parallel to the axis of rotation of the tire. An element E is said to be "axially inside" an element F (or "axially on the inside of" the element F) if it is closer to the midplane of the tire than is the element F. Conversely, an element G is said to be "axially outside" an element H (or "axially on the outside of" the element H) if it is further from the midplane of the tire than is the element H.

The "midplane" of the tire is the plane which is perpendicular to the axis of rotation of the tire and lies equal distances from the annular reinforcing structures of each bead.

A "circumferential" direction is a direction which is perpendicular both to a radius of the tire and to the axial direction.

Example of a Tire and Bead Wire According to the Invention

The figures that follow depict directions X, Y, Z corresponding to the usual axial (X), radial (Y) and circumferential (Z) orientations of a tire.

Figure 1:
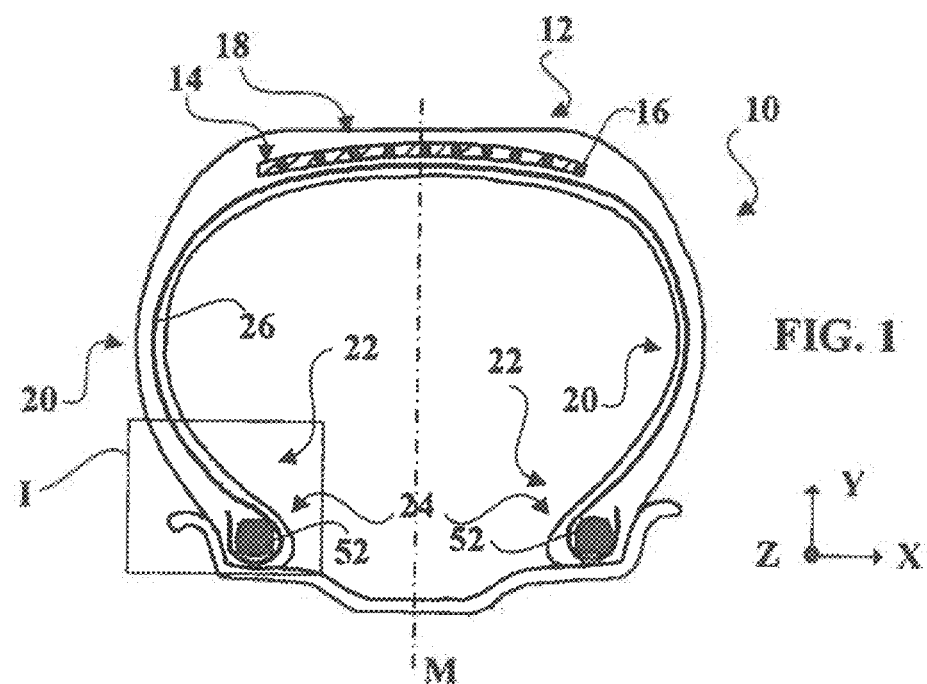
FIG. 1 is a view in radial section of a tire according to the invention.
Figure 2:
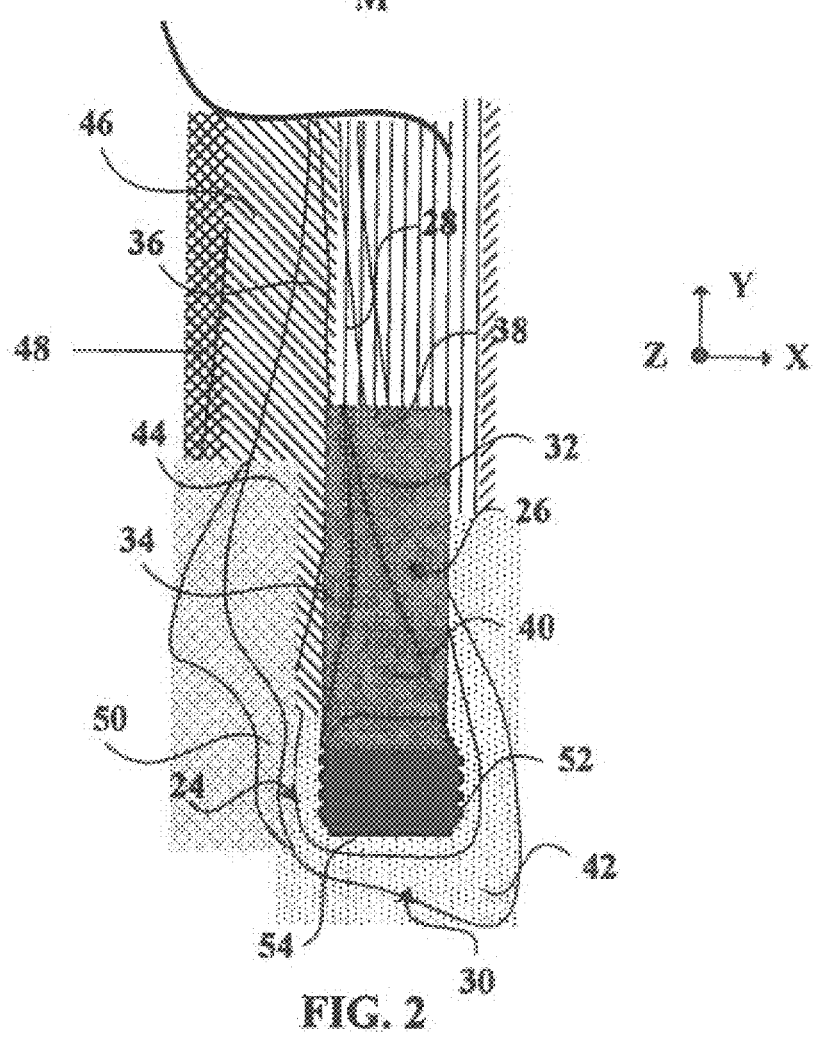
FIG. 2 is a detailed view in cross section of region I of the tire of FIG. 1.

FIGS. 1 and 2 depict an example of a tire according to the invention and denoted by the general reference 10. The tire 10 is preferably intended for an industrial vehicle selected from motor vehicles of the passenger car type, SUVs (Sport Utility Vehicles), two-wheeled vehicles (notably bicycles, motorbikes), heavy vehicles such as heavy goods vehicles—i.e. metro vehicles, buses, road haulage vehicles (lorries, tractors, trailers), off the road vehicles—agricultural vehicles or construction plant vehicles, aircraft, other transport or handling vehicles. In this particular instance, the tire 10 is intended for an agricultural vehicle, for example a tractor.

The tire 10 has a nominal rim diameter as defined by the ETRTO (European Tire and Rim Technical Organisation) of between 24 and 54 inches endpoints inclusive (between 60.96 cm and 137.16 cm). The tire 10 has a nominal aspect ratio as defined by the ETRTO of between 0.7 and 0.9, endpoints inclusive.

The tire 10 comprises a crown 12 comprising a crown reinforcement 14 comprising one or more crown plies 16 of reinforcing elements. The crown reinforcement 14 is surmounted by a tread 18. The crown reinforcement 14 is arranged radially in the inside of the tread 18. Two sidewalls 20 extend the crown 12 radially inwards. The tire 10 comprises two beads 22 radially on the inside of the sidewalls 20 and each comprising an annular reinforcing structure 24.

The tire 10 also comprises a radial carcass reinforcement 26. The carcass reinforcement 26 extends from the beads 22 through the sidewalls 20 towards the crown 12. The carcass reinforcement 26 comprises one or more carcass plies 28, at least one of these carcass plies 28 being anchored in each of the beads 22 by being folded 30 around the annular reinforcing structure 24 to form, within each bead 22, a main strand 32 extending radially between each bead 22 through the sidewalls 20 and the crown 12, and a turnup 34 extending radially from each bead 22 through each sidewall 20, the radially external end 36 of the turnup 34 being situated radially on the outside of the annular reinforcing structure 24 and axially on the outside of the main strand 32.

The tire 10 also comprises an airtight inner ply 38 arranged radially and axially on the inside of the carcass reinforcement 26. The inner ply 38 extends between each bead 22, passing via the sidewalls 20 and the crown 12.

Each bead 22 comprises, in addition to the annular reinforcing structure 24, a mass 40 of filling rubber arranged in a space delimited by the main strand 32 and the turnup 34. Each bead 22 also comprises a first mass 42 of cushioning rubber protecting the bead 22 around the folding 30 of the carcass reinforcement 26.

In addition, each bead 22 also comprises a mass 44 of filling rubber arranged axially outside the carcass reinforcement 26, particularly axially outside the turnup 34. Each sidewall 20 comprises a mass 46 of axially external rubber delimiting an axially external surface 48 of the sidewall 20 and arranged axially on the outside of the mass 44 of filling rubber. Finally, each bead 22 comprises a second mass 50 of cushioning for the bead 22, arranged axially between the mass 44 of filling rubber and the axially external mass 46 of rubber of the sidewall 20.

Each annular reinforcing structure 24 comprises an annular bead wire 52 coated in an encasing mass 54, for example containing rubber. The bead wire 52 is arranged radially on the inside of the mass 40 of filling rubber. The bead wire 52 is in accordance with a first embodiment of the invention.

Figure 3:
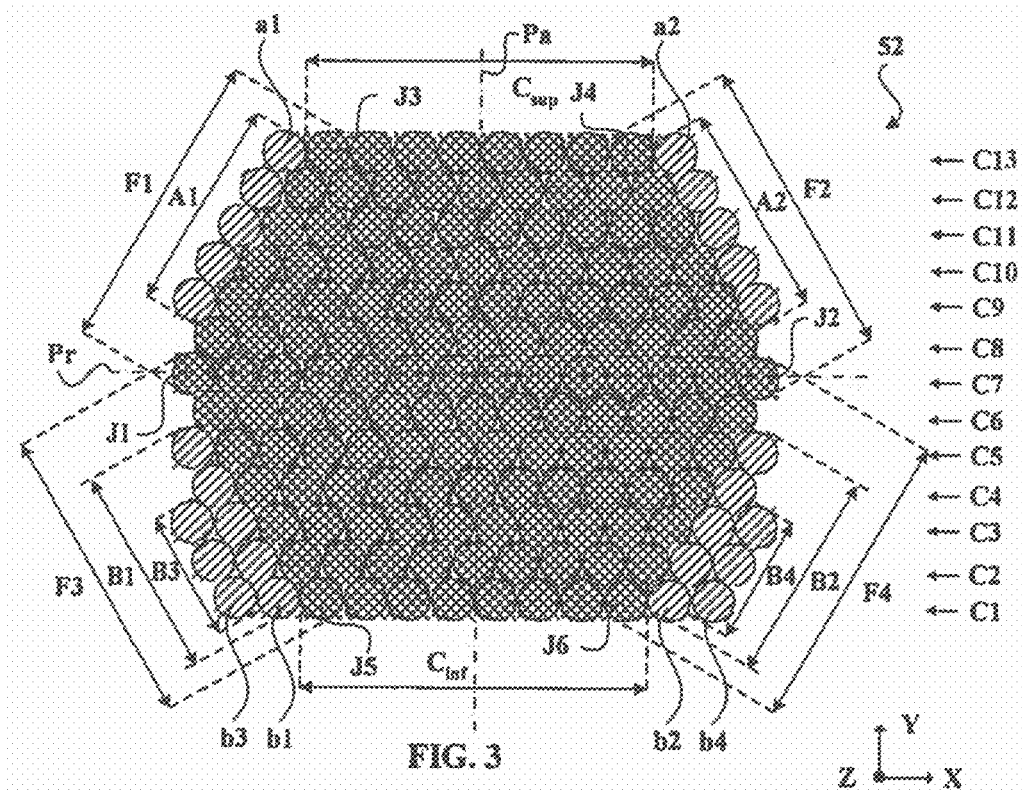
FIG. 3 is a view in cross section of a bead wire according to a first embodiment of the invention.

FIG. 3 depicts the bead wire 52 according to the first embodiment of the invention.

The bead wire 52 has an overall shape of revolution about the axis of revolution of the tire 10 which is substantially parallel to the axial direction X.

The bead wire 52 has an axial plane of symmetry Pa, namely a plane of symmetry that is perpendicular to the axial direction X (parallel to the midplane M).

The bead wire 52 comprises P windings of at least one wire which are arranged axially next to one another over N layers $C_i$ radially superposed on one another. The bead wire 52 is obtained by successive superpositions of the N layers $C_i$ with i varying from 1 to N inclusive, each layer $C_i$ being obtained by axially successive windings of at least one wire. The total number of windings P of the bead wire 52 is greater than or equal to 30, preferably greater than or equal to 50, and more preferably, greater than or equal to 70 and here P=166.

In the example of FIG. 3, the bead wire 52 comprises P windings of a single wire. For preference, the wire is made of metal, has a substantially circular cross section and advantageously a diameter of between 1 and 3.2 mm, preferably between 1.2 and 2.2 mm, and more preferably, between 1.2 and 2 mm, here a diameter equal to 1.55 mm. The wire is made of a carbon steel containing 0.7 wt % of carbon.

The bead wire 52 thus comprises, starting from the radially innermost layer $C_1$ to the radially outermost layer $C_N$, N radially successive layers with N≥5, preferably N≥7 and more preferably N≥9, and here N=13.

Table 1 below collates the number of windings $L_i$ of each layer $C_i$. The maximum number of windings $max(L_i)$ of the N layers $C_i$ is such that $max(L_i)≥4$, preferably $max(L_i)≥6$, and more preferably, $max(L_i)≥9$. Here, $max(L_i)=14$. In addition, $max(L_i)=N-1$, $max(L_i)=N$ or $max(L_i)=N+1$. Here, $max(L_i)=N+1$.

TABLE 1

| Number of the layer Ci | Number of windings Li |
|---|---|
| C1 | 12 |
| C2 | 13 |
| C3 | 14 |
| C4 | 13 |
| C5 | 14 |
| C6 | 13 |
| C7 | 14 |
| C8 | 13 |
| C9 | 14 |
| C10 | 13 |
| C11 | 12 |
| C12 | 11 |
| C13 | 10 |

The bead wire 52 comprises at least one layer $C_k$ where $k \in ]1, N[$ such that $L_{k+1}>L_k$ and $L_k<L_{k-1}$. In addition, for i varying from 1 to N inclusive, $|L_{k+1}-L_k|=1$. Furthermore, for each layer $C_k$, where $k \in ]1, N[$ such that $L_{k+1}>L_k$ and $L_k<L_{k-1}$, $L_{k+1}=L_k+1$ and $L_k+1=L_{k-1}$. Here, each layer $C_4$, $C_6$ and $C_8$ comprises $L_4=L_6=L_8=13$ windings and each layer $C_3$, $C_5$, $C_7$ and $C_9$ comprises $L_3=L_5=L_7=L_9=14$ windings.

The bead wire 52 comprises a base bead wire 56 of which the windings are depicted in the various FIGS. 3 and 5-8 by circles filled with a pattern of crosshatching. The bead wire 56 has an axial plane of symmetry Pa, namely a plane of symmetry perpendicular to the axial direction X (parallel to the midplane M). The bead wire 56 also has a radial plane of symmetry Pr, namely a plane of symmetry perpendicular to the radial direction Y.

The base bead wire 56 has a hexagonal shape, namely a shape comprising six sides each one defined by a layer or a row of windings each one meeting the next at six junctions J1 to J6 each one formed by a winding that a layer and a row or two rows that form the corresponding junction have in common.

Thus, the base bead wire 56 comprises a radially internal side defined by a radially internal layer $C_{inf}$ of N1 windings and a radially external side defined by a radially external layer $C_{sup}$ of N1 windings. The base bead wire 56 also comprises two radially external axial sides each one defined by an axially and radially external lateral row F1, F2 of N2 windings. The base bead wire 56 additionally comprises two radially internal axial sides each one defined by an axially external and radially internal lateral row F3, F4 of N2 windings. The pairs of radially external and internal axial sides are axially opposite one another, namely face one another about the axial direction X.

N1=N2+1 or N1=N2 and here N1=N2+1. Specifically, N1=8 and N2=7.

Each junction J1, J2 is formed by a winding that each axially and radially external lateral row F1, F2 and each axially external and radially internal lateral row F3, F4 have in common. Each winding in common that forms each junction J1, J2 has no winding of the wire axially on the outside of it.

Each junction J3, J4 is formed by a winding that each axially and radially external lateral row F1, F2 and the radially external layer $C_{sup}$ have in common.

Each junction J5, J6 is formed by a winding that each axially external and radially internal lateral row F3, F4 and the radially external layer $C_{inf}$ have in common.

The bead wire 52 also comprises at least two axially and radially external additional lateral rows A1, A2 of N3 windings. Each axially and radially external additional lateral row A1, A2 is substantially parallel respectively to each axially and radially external lateral row F1, F2.

Each axially and radially external additional lateral row A1, A2 is arranged axially on the outside respectively of each axially and radially external lateral row F1, F2. Here N3=5.

In this embodiment, each axially and radially external additional lateral row A1, A2 comprises a radially external winding a1, a2 radially substantially aligned with the radially external layer $C_{sup}$.

N3≤N2 and for preference N3=N2, N3+1=N2 or N3+2=N2. In this instance, N3+2=N2.

In this embodiment, the bead wire 52 also comprises at least two axially external and radially internal additional lateral rows B1, B2, B3, B4. The bead wire 52 comprises two pairs of axially external and radially internal additional lateral rows, B1, B2 on the one hand, and B3, B4 on the other hand, of N5 and N6 windings respectively. Each axially external and radially internal additional lateral row B1, B3 on the one hand, and B2, B4 on the other hand, is substantially parallel respectively to each axially external and radially internal lateral row F3, F4.

Each axially external and radially internal additional lateral row, B1, B3 on the one hand, and B2, B4 on the other hand, is arranged axially on the outside respectively of each axially external and radially internal lateral row B3, F4. Each axially external and radially internal additional lateral row B3, B4 is arranged axially on the outside respectively of each axially external and radially internal additional lateral row B1, B2.

In this embodiment, each axially external and radially internal additional lateral row B1, B2, B3, B4 comprises a radially internal winding b1, b2, b3, b4 radially substantially aligned with the radially internal layer $C_{inf}$.

N5≥N6, preferably N5>N6 and here N5=N6+2 with N5=5 and N6=3. Also, N5≤N2, preferably N5=N2, N5+1=N2 or N5+2=N2 and here N5+2=N2.

Also, $max(L_i)-N1≤6$.

The windings of the additional lateral rows A1, A2, B1, B2, B3 and B4 are depicted as circles filled with a pattern of parallel hatching.

Example of the Method According to the Invention

A method of manufacturing a tire according to the invention will now be described with reference to FIGS. 4a to 4d.

First of all, in a first tire-building phase, the various plies, masses of rubber and other elements described hereinabove are built up to form a green tire on a tire-building drum already known to those skilled in the art.

Thus, the first mass 42 of cushioning rubber, airtight inner ply 38, one or more carcass plies 28 intended to be anchored in the bead 20, the mass 40 of filling rubber and the annular reinforcing structure 24 comprising the bead wire 52 and the encasing mass 54 are laid in succession and in that order. Thus, the bead wire 52 has been placed on the carcass ply or plies 28. This results in the intermediate green tire form depicted in FIG. 4a.

The first mass 42 of cushioning rubber and part of the carcas ply or plies 28, in this instance the turnup 34, is then folded around the annular reinforcing structure 24. This then results in the intermediate green tire form depicted in FIG. 4b.

Next, the mass 44 of filling rubber, the second cushioning mass 50 and finally the axially external mass 46 of rubber delimiting the axially external surface 48 of the sidewall 20 are placed in succession and in that order. This then results in the intermediate green tire form depicted in FIG. 4c.

Finally, the carcass ply or plies 28 and the bead wire 52 are turned relative to one another. In this instance, the entire intermediate green tire form with the exception of the annular reinforcing structure 24 is turned about the latter which remains substantially fixed during rotation. As an alternative, the bead wire 52 could be turned keeping the remainder of the green tire form fixed. This then results in the intermediate green tire form depicted in FIG. 4d. It may be noted that following the rotation, the bead wire 52 has the same orientation that it had before rotation and that the various plies and masses of rubber have not been deformed under the effect of the rotation.

In a subsequent second finishing phase, the crown 12 and the tread 18 are added to the intermediate green tire form previously obtained.

In a third, curing, phase, the final green tire is cured in order to obtain the cured tire.

Other Examples of Bead Wires According to the Invention

FIGS. 5, 6, 7 and 8 depict bead wires according to other embodiments of the invention. In these figures, elements similar to those of FIG. 3 are denoted by identical references.

Figure 5:
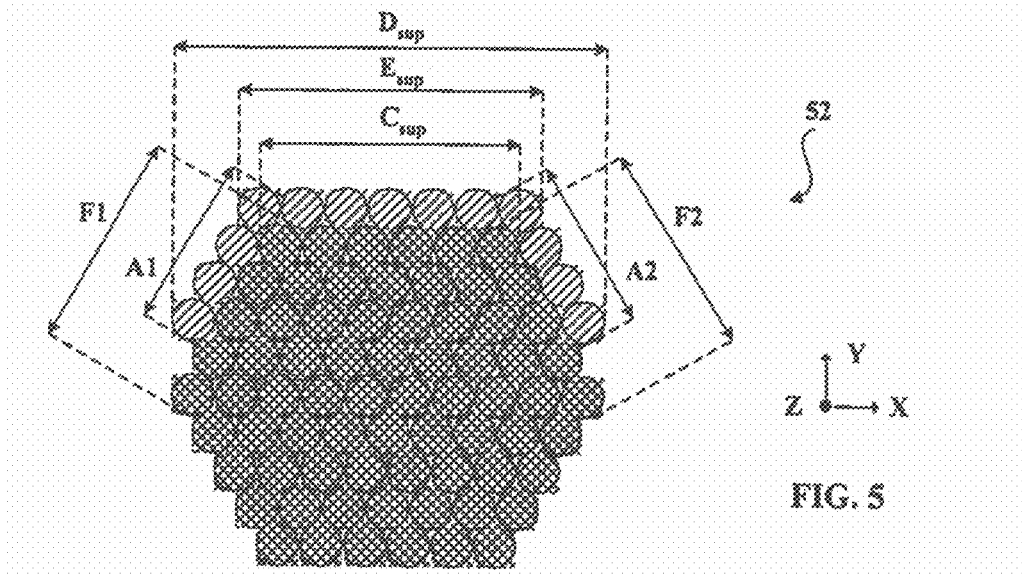
FIGS. 5 to 8 are views similar to that of FIG. 3 of bead wires respectively according to second, third, fourth and fifth embodiments.

FIG. 5 depicts a bead wire according to a second embodiment of the invention.

Unlike the bead wire according to the first embodiment, the bead wire 52 according to the second embodiment comprises N=10 layers and P=83 windings.

Table 2 below collates the number of windings $L_i$ of each layer $C_i$. $\max(L_i) = N = 10$.

TABLE 2

| Number of the layer Ci | Number of windings Li |
|---|---|
| C1 | 6 |
| C2 | 7 |
| C3 | 8 |
| C4 | 9 |
| C5 | 10 |
| C6 | 9 |
| C7 | 10 |

TABLE 2-continued

| Number of the layer Ci | Number of windings Li |
|---|---|
| C8 | 9 |
| C9 | 8 |
| C10 | 7 |

The bead wire 52 comprises at least one layer $C_k$ where $k \in ]1, N[$ such that $L_{k+1} > L_k$ and $L_k < L_{k-1}$. Furthermore, for each layer $C_k$ where $k \in ]1, N[$ such that $L_{k+1} > L_k$ and $L_k < L_{k-1}$, $L_{k+1} = L_k + 1$ and $L_k + 1 = L_{k-1}$. Here, the layer $C_6$ comprises $L_6 = 9$ windings and each layer $C_5$, $C_7$ comprises $L_5 = L_7 = 10$ windings.

The base bead wire 56 is such that N1=N2+1. Specifically, N1=6, N2=5.

Unlike the bead wire of the first embodiment, the bead wire 52 according to the second embodiment comprises at least one axially and radially external additional covering $D_{sup}$ of windings in the overall shape of a U. The windings of the axially and radially external additional covering $D_{sup}$ are depicted as circles filled with a pattern of parallel hatching.

The windings of the axially and radially external additional covering $D_{sup}$ are arranged axially on the outside of each axially external lateral row and radially on the outside of the radially external layer $C_{sup}$.

The axially and radially external additional covering $D_{sup}$ comprises a radially external additional layer $E_{sup}$ of N4 windings, substantially parallel to the radially external layer $C_{sup}$. The additional layer $E_{sup}$ is radially arranged on the outside of the radially external layer $C_{sup}$. The bead wire 52 according to the second embodiment is such that N4=N1+1.

The axially and radially external additional covering $D_{sup}$ also comprises two axially and radially external additional lateral rows A1, A2 of N3 windings. Each additional lateral row A1, A2 is substantially parallel respectively to each axially and radially external lateral row F1, F2. Each axially and radially external additional lateral row A1, A2 is arranged axially on the outside respectively of each axially and radially external lateral row F1, F2.

Here, N3=4. N3≤N2 and here N3+1=N2.

Also, $\max(L_i) - N1 \le 6$.

Figures 6, 7:
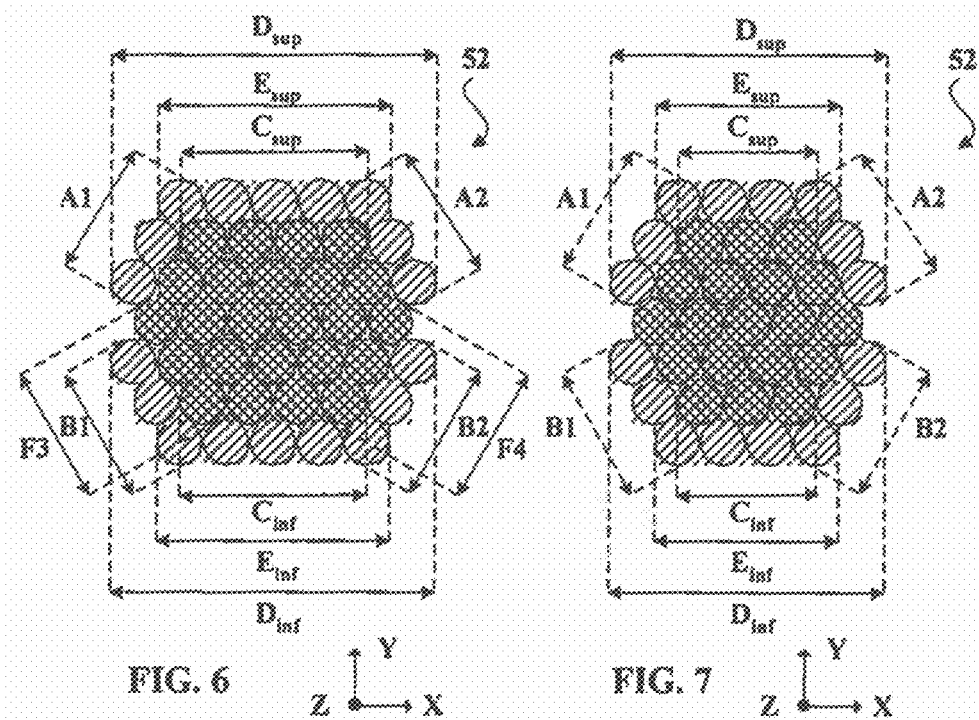

FIG. 6 depicts a bead wire according to a third embodiment of the invention.

The bead wire 52 according to the third embodiment comprises N=7 layers and P=42 windings.

Table 3 below collates the number of windings $L_i$ of each layer $C_i$. $\max(L_i) = N = 7$.

TABLE 3

| Number of the layer Ci | Number of windings Li |
|---|---|
| C1 | 5 |
| C2 | 6 |
| C3 | 7 |
| C4 | 6 |
| C5 | 7 |
| C6 | 6 |
| C7 | 5 |

The bead wire 52 comprises at least one layer $C_k$ where $k \in ]1, N[$ such that $L_{k+1} > L_k$ and $L_k < L_{k-1}$. Furthermore, for each layer $C_k$ where $k \in ]1, N[$ such that $L_{k+1} > L_k$ and $L_k < L_{k-1}$, $L_{k+1} = L_k + 1$ and $L_k + 1 = L_{k-1}$. Here, the layer C4 comprises $L_4 = 6$ windings and each layer $C_3$, $C_5$ comprises $L_3 = L_5 = 7$ windings.

The bead wire 52 according to the third embodiment is such that N1=N2+1. Specifically, N1=4 and N2=3. Additionally, N3≤N2 and here N3=N2=3. Furthermore, N4=N1+1 with N4=5 and N1=4.

Unlike the bead wire according to the second embodiment, the bead wire 52 according to the third embodiment comprises at least one axially external and radially internal additional covering $D_{inf}$ of windings in the overall shape of a U. The windings of the axially external and radially internal additional covering $D_{inf}$ are depicted as circles filled with a pattern of parallel hatching.

The windings of the axially external and radially internal additional covering $D_{inf}$ are arranged axially on the outside of each axially internal and radially external lateral row and radially on the inside of the radially internal layer $C_{inf}$.

The axially external and radially internal additional covering $D_{inf}$ comprises a radially internal additional layer $E_{inf}$ of N7 windings substantially parallel to the radially internal layer $C_{inf}$. The radially internal additional layer $E_{inf}$ is arranged radially on the inside of the radially internal layer $C_{inf}$.

The axially external and radially internal additional covering $D_{inf}$ also comprises two axially external and radially internal additional lateral rows B1, B2 of N5 windings. This axially external and radially internal additional lateral row B1, B2 is substantially parallel respectively to each axially external and radially internal lateral row F3, F4. Each axially external and radially internal additional lateral row B1, B2 is axially arranged on the outside respectively of each axially external and radially internal lateral row F3, F4.

N5≤N2, and here, N5=N2=3 and N7=N1+1 with N7=5. Also, max($L_i$)−N1≤6 and preferably max($L_i$)−N1≤2.

FIG. 7 depicts a bead wire according to a fourth embodiment of the invention.

The bead wire 52 according to the fourth embodiment comprises N=7 layers and P=35 windings.

Table 4 below collates the number of windings $L_i$ of each layer $C_i$. max($L_i$)=N−1=6.

TABLE 4

| Number of the layer Ci | Number of windings Li |
|---|---|
| C1 | 4 |
| C2 | 5 |
| C3 | 6 |
| C4 | 5 |
| C5 | 6 |
| C6 | 5 |
| C7 | 4 |

The bead wire 52 comprises at least one layer $C_k$ where k ∈ ]1, N[ such that $L_{k+1} > L_k$ and $L_k < L_{k-1}$. Furthermore, for each layer $C_k$ where k ∈ ]1, N[ such that $L_{k+1} > L_k$ and $L_k < L_{k-1}$, $L_{k+1} = L_k + 1$ and $L_k + 1 = L_{k-1}$. Here, the layer $C_4$ comprises $L_4 = 5$ windings and each layer $C_3$, $C_5$ comprises $L_3 = L_5 = 6$ windings.

Unlike the bead wire 52 according to the third embodiment, N1=N2=3. In addition, N3≤N2 and here N3=N2=3. Furthermore, N4=N1+1 with N4=4 and N1=3. Also, N5≤N2 and here N5=N2=3 and N7=N1+1 with N7=4. Also, max ($L_i$)−N1≤6 and preferably N1−max($L_i$)≤2.

Figure 8:
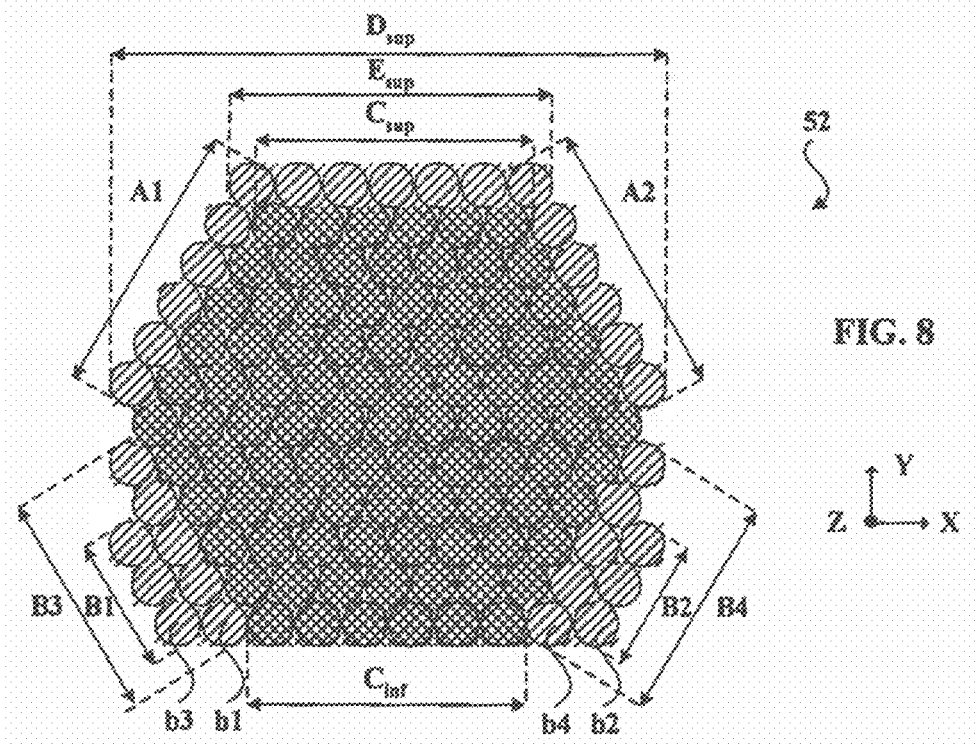

FIG. 8 depicts a bead wire according to a fifth embodiment of the invention.

The bead wire 52 according to the fifth embodiment comprises N=12 layers and P=35 windings. N1=N2=6.

Table 5 below collates the number of windings $L_i$ of each layer $C_i$. max($L_i$)=N=12.

TABLE 5

| Number of the layer Ci | Number of windings Li |
|---|---|
| C1 | 10 |
| C2 | 11 |
| C3 | 12 |
| C4 | 11 |
| C5 | 12 |
| C6 | 11 |
| C7 | 12 |
| C8 | 11 |
| C9 | 10 |
| C10 | 9 |
| C11 | 8 |
| C12 | 7 |

The bead wire 52 comprises at least one layer $C_k$ where k ∈ ]1, N[ such that $L_{k+1} > L_k$ and $L_k < L_{k-1}$. Furthermore, for each layer $C_k$, where k ∈ ]1, N[ such that $L_{k+1} > L_k$ and $L_k < L_{k-1}$, $L_{k+1} = L_k + 1$ and $L_k + 1 = L_{k-1}$. Here, each layer $C_4$, $C_6$ comprises $L_4 = L_6 = 11$ windings and each layer $C_3$, $C_5$, $C_7$ comprises $L_3 = L_5 = L_7 = 12$ windings.

In a similar way to the bead wire according to the second embodiment of FIG. 5, the bead wire 52 according to the fifth embodiment comprises an axially and radially external additional covering $D_{sup}$ of windings in the overall shape of a U.

The axially and radially external additional covering $D_{sup}$ comprises a radially external additional layer $E_{sup}$ of N4 windings, substantially parallel to the radially external layer $C_{sup}$. The radially external additional layer $E_{sup}$ is radially arranged on the outside of the radially external layer $C_{sup}$.

The axially and radially external additional covering $D_{sup}$ also comprises two axially and radially external additional lateral rows A1, A2 of N3 windings substantially parallel respectively to each axially and radially external row F1, F2. Each axially external and radially internal additional lateral row A1, A2 is axially arranged on the outside respectively of each axially external and radially internal lateral row F1, F2.

The bead wire 52 according to the second embodiment is such that N3≤N2 and here N3=N2=6. Furthermore N4=N1+1 with N4=7 and N1=6.

In a similar way to the bead wire according to the first embodiment, the bead wire 52 according to the fifth embodiment also comprises two pairs of axially external and radially internal additional lateral rows, B1, B2 on the one hand, and B3, B4 on the other hand, respectively of N5 and N6 windings.

In this embodiment, each axially external and radially internal additional lateral row B1, B2, B3, B4 comprises a radially internal winding b1, b2, b3, b4 radially substantially aligned with the radially internal layer $C_{inf}$.

The axially external and radially internal additional lateral rows, B1, B2, on the one hand, and B3, B4 on the other hand, are respectively substantially parallel to each axially external and radially internal row F3, F4. Each axially external and radially internal additional lateral row, B1, B2 on the one hand, and B3, B4 on the other hand, is axially arranged on the outside respectively of each axially external and radially internal lateral row F3, F4.

N5≥N96, preferably N5>N6 and here N5=N6+2 with N5=5 and N6=3. Also, N5≤N2 and here N5+1=N2.

Also max($L_i$)−N1≤6.

COMPARATIVE TESTS AND TRIALS

Performance of the Method of Manufacture

FIG. 9 depicts a bead wire 100 of the prior art. This bead wire has none of the features essential to the invention that allow easy relative rotation of the bead wire with respect to the carcass ply.

FIG. 10 depicts a tire 200 of the prior art comprising a bead wire 100 and manufactured by employing steps similar to the steps described with reference to FIGS. 4a to 4d. The tire 200 has defects that have been deliberately exaggerated for the purposes of illustrating the advantages of the invention.

Note the presence of the region in which the turnup 34' and the masses of rubber 44', 46' and 50' arranged axially on the outside of the turnup have been placed in compression. The overtensioning of the main strand 32' causes the windings in contact with the main strand 32' but also those in contact with the turnup 34' to become disorganized. In addition, the relative rotation falls short by an angle α.

Comparing FIG. 2 (or 4d) and 10, it may be noted that use of the method of manufacture according to the invention leads to a tire that does not have the potential defects unlike the tire 200.

Tire-Rim Slip Performance

The tire-rim slip performance of each tire was tested. Specifically, in order for the tire to be able to transfer all of the force applied by the engine or motor of the vehicle to the ground, it is preferable that the tire-rim slip be as low as possible.

The co-efficient of friction μ between the rim and tire is therefore measured. To do so, use is made of a vehicle with a total mass of 2 tonnes provided with two tires to be tested. A weight of equal mass, in this instance 2 tonnes, is then hauled over bitumen. Between the weight that is to be hauled and the vehicle is positioned a dynamometric sensor that enables the force F, expressed in kg applied by the vehicle to the weight to be hauled to be measured as the tire begins to slip relative to the rim. Thus, for a force F=500 kg applied in order to cause the tire to slip relative to the rim, a co-efficient of friction μ=0.5 is obtained. A score of between 0 and 5.0 is assigned according to the force recorded, zero indicating a tire exhibiting a great deal of tire-rim slip and 5 indicating a tire with the best possible tire-rim slip performance. The results of these tests are collated in Table 6 below.

TABLE 6

| Bead wire | Score |
|---|---|
| 100 | 5 |
| 52 - FIG. 3 | 5 |
| 52 - FIG. 5 | 3 |
| 52 - FIG. 6 | 5 |
| 52 - FIG. 7 | 4 |
| 52 - FIG. 8 | 5 |

The scores of 4 and 5 are considered to indicate a low tire-rim slip and therefore that the corresponding tires meet the required tire-rim slip performance criterion. Note that all the tires according to the invention, with the exception of the tire according to the second embodiment, have a score of 4 or higher.

Thus, the tires according to the invention of FIGS. 3, 6, 7 and 8 make it possible to avoid the need to take special precautions during the method of manufacture and exhibit low tire-rim slip.

The invention is not restricted to the embodiments described hereinabove.

Thus, the axially and radially external additional covering $D_{sup}$ may comprise several radially external additional layers $E_{sup}$ substantially parallel to the radially external layer $C_{sup}$ as well as several pairs of axially and radially external additional lateral rows.

The features of the various embodiments described hereinabove may be combined in so far as they are mutually compatible.

What is claimed is:

1. A bead wire for a tire substantially of revolution about an axis comprising several windings of at least one wire which are arranged axially next to one another over N layers radially superposed on one another, comprising:
   a basic hexagonal bead wire comprising:
      a radially external layer of N1 windings,
      a radially internal layer of N1 windings,
      two axially and radially external lateral rows of N2 windings axially opposite one another,
      two axially external and radially internal lateral rows of N2 windings axially opposite one another, with N1=N2 +1 or N1=N2, and
      two junctions each one formed by a winding that an axially and radially external lateral row and an axially external and radially internal lateral row have in common, each winding in common forming each junction having no winding of the bead wire axially on the outside of it; and
   additional windings comprising:
      axially external and radially internal additional windings, the axially external and radially internal additional windings consisting exclusively of two pairs of axially external and radially internal additional lateral rows, each of the two pairs of axially external and radially internal additional lateral rows having a radially internal winding radially aligned with the radially internal layer of the basic hexagonal bead wire.

2. The bead wire according to claim 1, the additional windings further comprising:
   two axially and radially external additional lateral rows of N3 windings axially opposite one another,
   wherein each radially external winding of each axially and radially external additional lateral row is radially substantially aligned with the radially external layer of the basic hexagonal bead wire.

3. The bead wire according to claim 2, wherein, with each axially and radially external additional lateral row comprising N3 windings, N3+1=N2 or N3+2=N2.

4. The bead wire according to claim 1, further comprising at least one axially and radially external additional covering of windings in the overall shape of a U.

5. The bead wire according to claim 4, wherein the axially and radially external additional covering comprises:
   a radially external additional layer of N4 windings, and substantially parallel to the radially external layer of the basic hexagonal bead wire, and
   at least two axially and radially external additional lateral rows.

6. The bead wire according to claim 5, wherein N4=N1+1.

7. The bead wire according to claim 1, wherein max $(L_i)$=N-1, max$(L_i)$=N or max$(L_i)$=N+1 where $L_i$ is the number of windings of each layer $C_i$, i varying from 1 to N inclusive.

8. A bead wire for a tire substantially of revolution about an axis comprising several windings of at least one wire which are arranged axially next to one another over N layers radially superposed on one another, comprising:

a basic hexagonal bead wire comprising:
  a radially external layer of N1 windings,
  a radially internal layer of N1 windings,
  two axially and radially external lateral rows of N2 windings axially opposite one another,
  two axially external and radially internal lateral rows of N2 windings axially opposite one another, with N1=N2+1 or N1=N2, and
  two junctions each one formed by a winding that an axially and radially external lateral row and an axially external and radially internal lateral row have in common, each winding in common forming each junction having no winding of the bead wire axially on the outside of it; and
additional rows comprising:
  at least two pairs of axially external and radially internal additional lateral rows, each of the at least two pairs of axially external and radially internal additional lateral rows having a radially internal winding radially aligned with the radially internal layer of the basic hexagonal bead wire,
the bead wire comprising at least one layer $C_k$ where k $\in$ ]1, N[ such that $L_{k+1}$>$L_k$ and $L_k$ <$L_{k-1}$.

9. A tire comprising:
at least one bead comprising at least one bead wire according to claim 1; and
a carcass reinforcement comprising at least one carcass ply anchored in each bead by a turnup around the bead wire.

10. A method of manufacturing a tire according to claim 9, wherein:
the bead wire is placed on the carcass ply,
a part of the carcass ply is folded around the bead wire, and
the carcass ply and the bead wire are turned relative to one another.

\* \* \* \* \*